United States Patent [19]
Lopez et al.

[11] Patent Number: 5,737,039
[45] Date of Patent: Apr. 7, 1998

[54] CONTROL PANEL FOR A TELEVISION

[75] Inventors: Michael Andrew Lopez; Satoshi Miyajima, both of San Diego; Anthony John Gangitano, Esconido, all of Calif.

[73] Assignees: Sony Corporation, Tokyo, Japan; Sony Electronics Inc., Park Ridge, N.J.

[21] Appl. No.: 696,421

[22] Filed: Aug. 13, 1996

[51] Int. Cl.$^6$ ............................... H04N 5/64; H05K 5/00
[52] U.S. Cl. ..................... 348/836; 348/789; 361/682
[58] Field of Search ................... 348/836, 789; 345/905; 361/681, 682

[56] References Cited

U.S. PATENT DOCUMENTS

| | | | |
|---|---|---|---|
| 5,348,407 | 9/1994 | Hock et al. | 400/711 |
| 5,455,743 | 10/1995 | Miyajima | 348/836 |
| 5,587,876 | 12/1996 | O'Brien et al. | 361/682 |
| 5,631,673 | 5/1997 | Yamamoto et al. | 345/905 |

*Primary Examiner*—Edward L. Coles, Sr.
*Assistant Examiner*—Twyler M. Lamb
*Attorney, Agent, or Firm*—Pasquale Musacchio; Jerry A. Miller

[57] ABSTRACT

A control panel is disclosed for a monitor having a cabinet. The control panel includes a cover having a top flange and a front flange, wherein the top flange includes a plurality of apertures and first resilient clips and the front flange includes a plurality of second resilient clips and a translucent section adapted for transmitting infrared light. The cover further includes a button module having resilient buttons and a plurality of third resilient clips, wherein each of the buttons extend through an associated aperture and are adapted to enable operation of selected functions of the monitor. In addition, the cover includes an emitter having light emitting elements for emitting infrared light, wherein the emitter is removably secured to the top cover by the third resilient clips such that the light emitting elements are positioned adjacent the translucent section. The cover also includes a printed circuit board having circuitry for operation of the monitor, wherein the printed circuit board is removably secured to the top flange by the first resilient clips and wherein the button module is removably secured between the printed circuit board and the top flange. In addition, an assembly area is located in an opening formed in the cabinet, wherein the top cover is removably secured to the assembly area by the second resilient clips to conceal the assembly area.

15 Claims, 9 Drawing Sheets

CONTROL PANEL FOR A TELEVISION

FIELD OF THE INVENTION

This invention relates to control panels for televisions, and more particularly, to a control panel which is assembled without the use of screw type fasteners.

BACKGROUND OF THE INVENTION

Electronic apparatus, such as television sets, computer monitors and others, include a cabinet which includes various switches for controlling operation of the apparatus. The switches are typically included in a control panel located in a front portion of the cabinet to enable an operator to access the switches. Such control panels include screw type fasteners which are used to assemble component parts of the control panel to each other and further, to affix the control panel to the cabinet. The use of such fasteners requires that associated fastening elements such as thru holes, threaded holes, brackets and others be provided within the control panel and cabinet to enable fastening. However, the fabrication of such fastening elements requires the use of relatively complicated manufacturing processes. This is a disadvantage since such processes increase manufacturing costs.

In addition, it is frequently desirable to remove the control panel from the cabinet and to disassemble the control panel into its component parts in order to be able to make repairs. However, this requires the removal and re-insertion of many fasteners, thus resulting in a time consuming and costly procedure. Further, the fasteners may be of different sizes, and thus care must be taken that the correct fasteners are used in the correct locations.

Additionally, many conventional control panels frequently have flanges or other elements which protrude outward relative to adjacent surfaces of the cabinet, thus detracting from aesthetic appeal of the cabinet. Still other control panels are undesirably positioned within an opening such that a non-uniform gap exists between the panel and adjacent surfaces, thus also detracting from aesthetic appeal.

Therefore, it is an object of the present invention to provide a control panel which may be removably secured to a cabinet without the use of screw type fasteners, and further, whose component parts may be assembled without the use of such fasteners. In addition, it is an object to provide a control panel which does not detract from the aesthetic appeal of the television.

SUMMARY OF THE INVENTION

It is an object of the present invention to provide a control panel for a monitor having a cabinet. The control panel includes a cover having a top flange and a front flange, wherein the top flange includes a plurality of apertures and first resilient clips and the front flange includes a plurality of second resilient clips and a translucent section adapted for transmitting infrared light. The cover further includes a button module having resilient buttons and a plurality of third resilient clips, wherein each of the buttons extend through an associated aperture and are adapted to enable operation of selected functions of the monitor. In addition, the cover includes an emitter having light emitting elements for emitting infrared light, wherein the emitter is removably secured to the top cover by the third resilient clips such that the light emitting elements are positioned adjacent the translucent section. The cover also includes a printed circuit board having circuitry for operation of the monitor, wherein the printed circuit board is removably secured to the top flange by the first resilient clips and wherein the button module is removably secured between the printed circuit board and the top flange. In addition, an assembly area is located in an opening formed in the cabinet, wherein the top cover is removably secured to the assembly area by the second resilient clips to conceal the assembly area.

These and other objects, advantages and features of the invention will become apparent to those skilled in the art upon consideration of the following description of the invention. The features of the invention believed to be novel are set forth with particularity in the appended claims. The invention itself, however, both as to organization and method of operation, together with further objects and advantages thereof, may be best understood by reference to the following description taken in conjunction with the accompanying drawing.

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in FIGS. 1–9.

Figure 1:
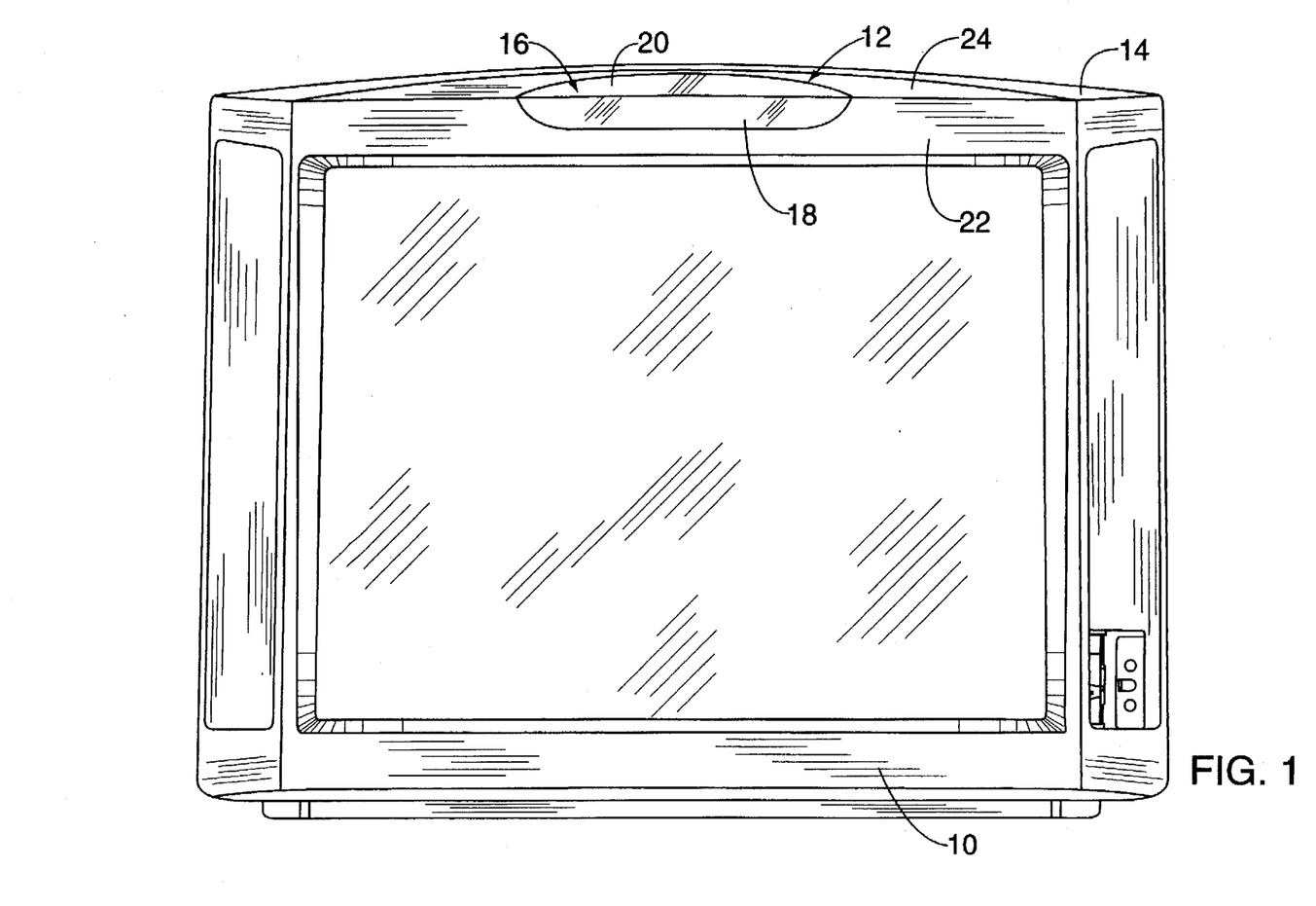
FIG. 1 is a front view of a television having a control panel in accordance with the present invention.
Figure 2:
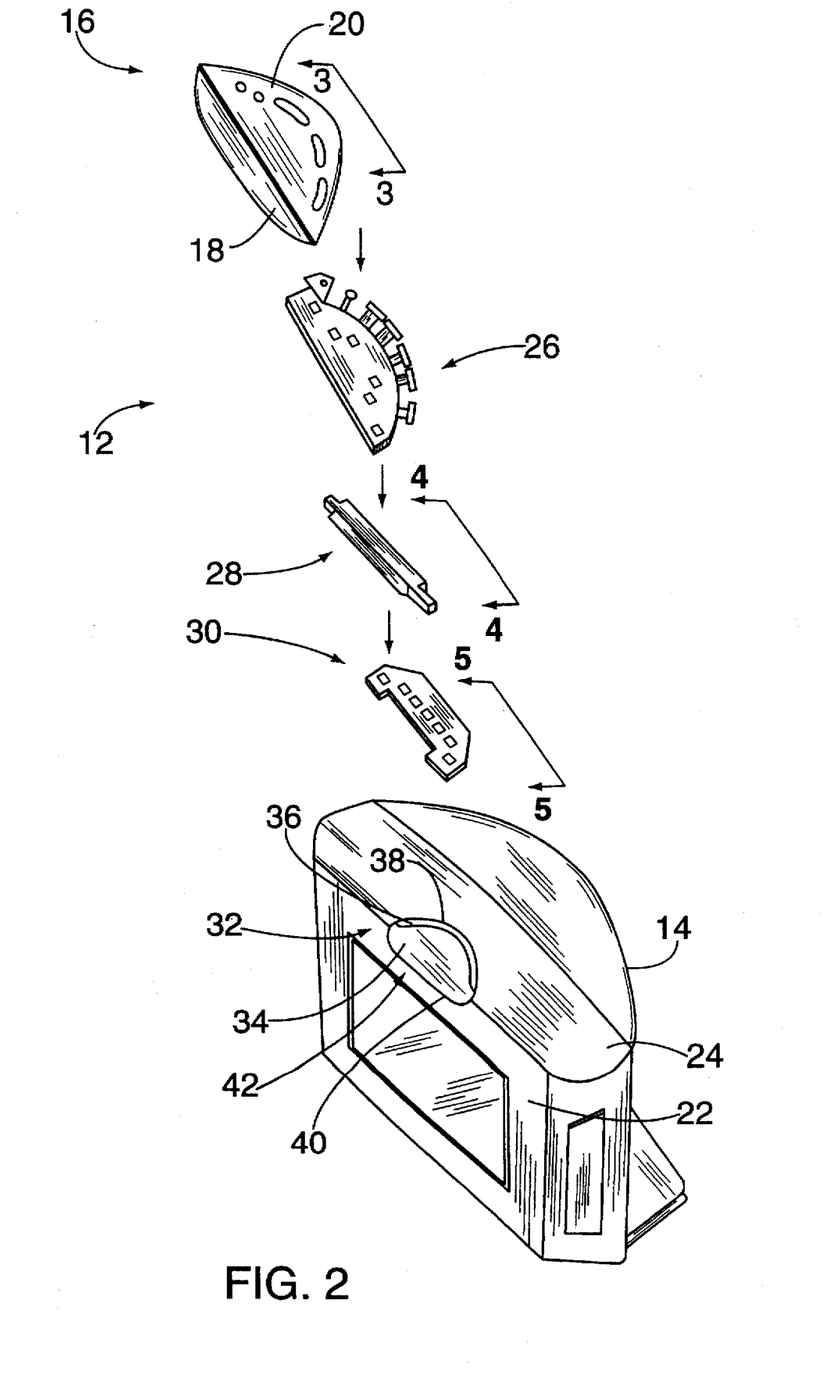
FIG. 2 is an exploded view of the control panel of the present invention.

Referring to FIG. 1, a front view of a television 10 having a control panel 12 in accordance with the present invention is shown. The control panel 12 is mounted to an accessible area such as a top portion of a television cabinet 14, although it is noted that the control panel 12 may be mounted to other suitable areas. The control panel 12 includes a top cover 16 having front 18 and top 20 flanges which are positioned flush with first 22 and second 24 surfaces, respectively, of the cabinet 14. Referring to FIG. 2, an exploded view of the control panel 12 is shown. The control panel 12 includes a button module 26, infrared emitter 28, and a printed circuit board 30 in addition to the top cover 16. The cabinet 14 includes an opening 42 defined by a front edge 40 that extends into the first surface 22 and an arcuately shaped back edge 38 that extends into the second surface 24. An assembly area 32 is located within the opening 42. The assembly area 32 includes an assembly surface 34 and a back surface 36 having an arcuate shape corresponding to that of the back edge 38. As will be described, the top cover 16, button module 26, infrared emitter 28 and printed circuit board 30 are assembled without the use of screw type fasteners to form the control panel 12. Further, the control panel 12 is positioned within the opening 42 and is removably secured to the assembly area 32 without the use of screw type fasteners.

Figure 3:
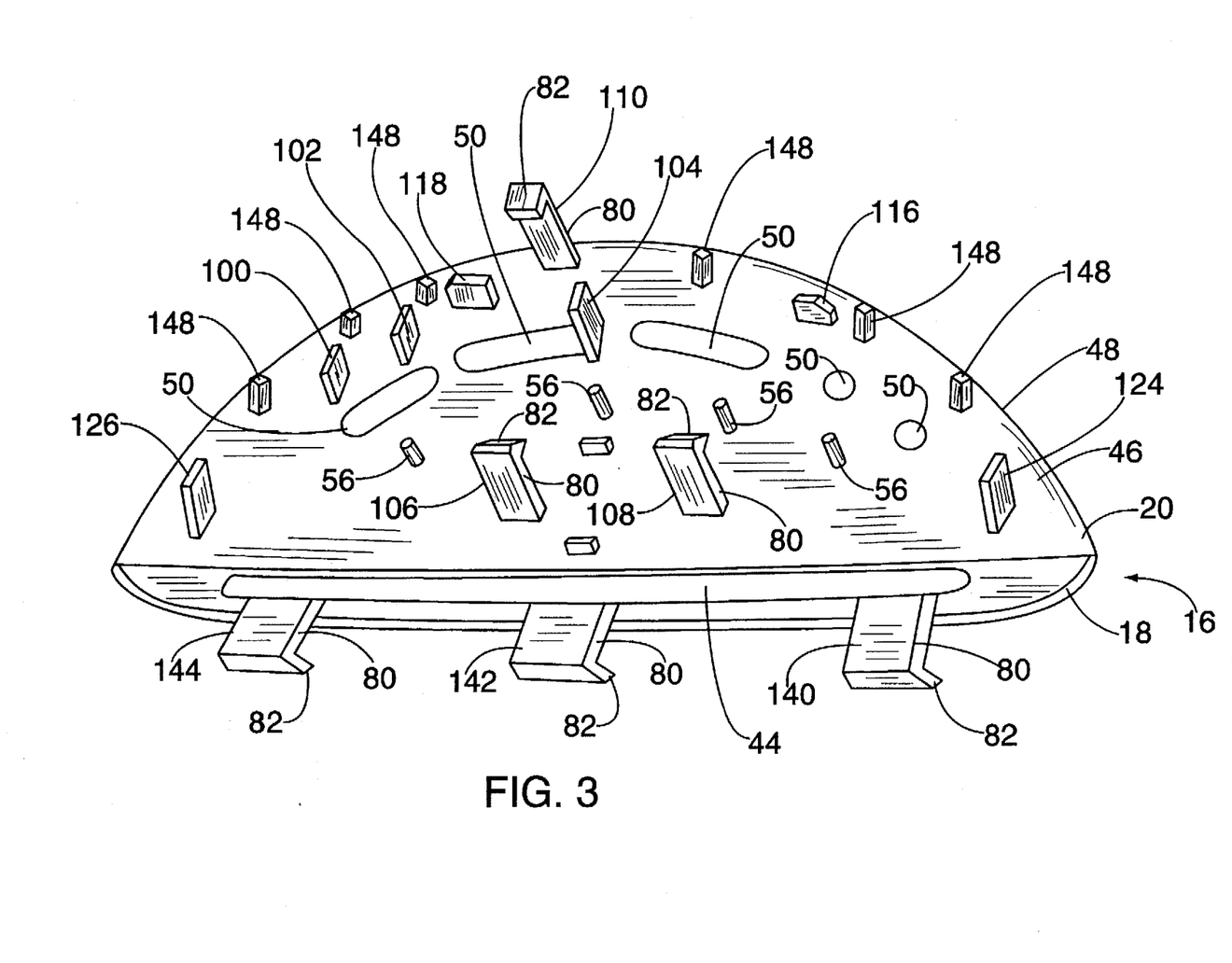
FIG. 3 is a bottom view of a top cover along view line 3—3 of FIG. 2.
Figure 4:
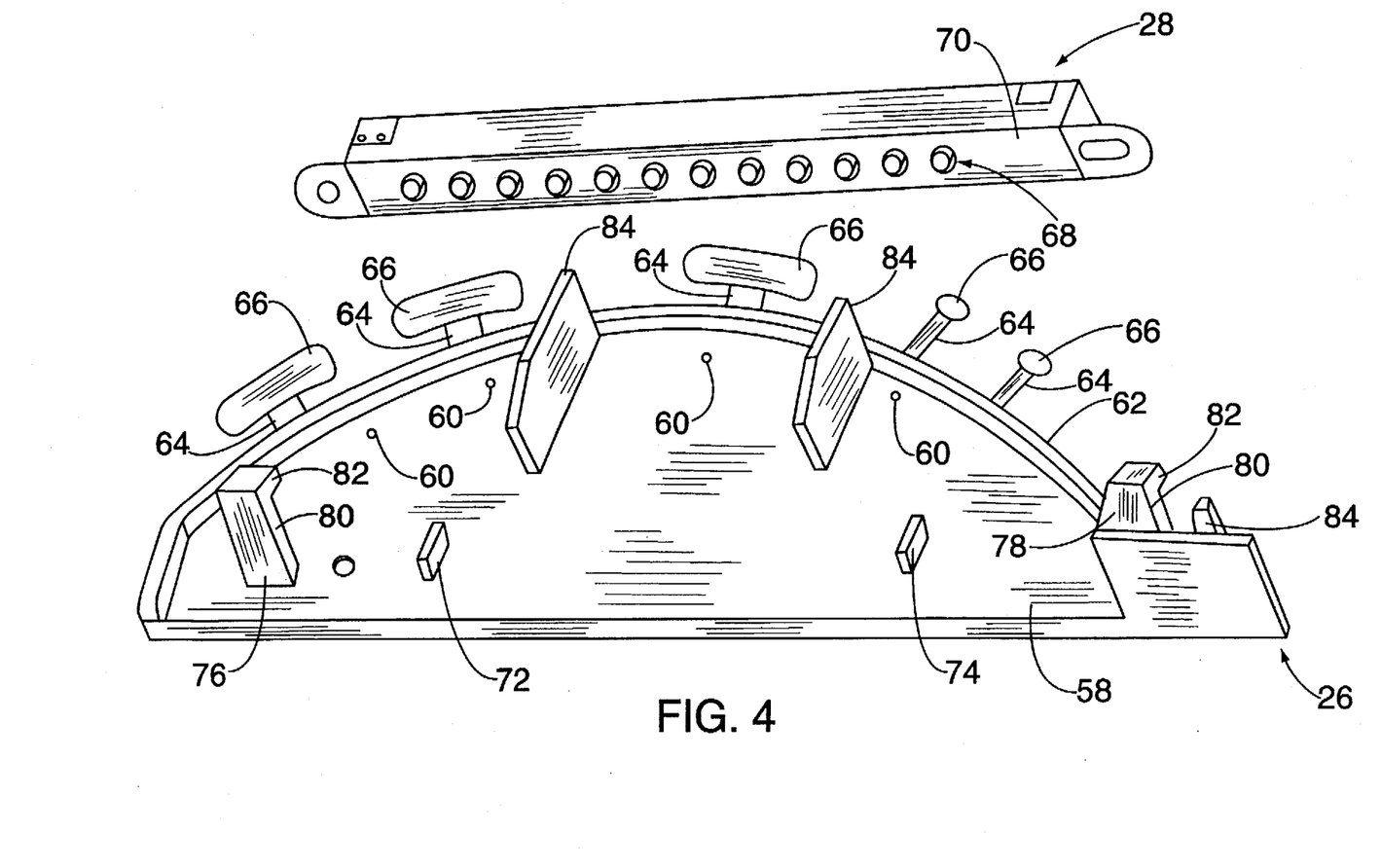
FIG. 4 is a bottom view of a button module and emitter along view line 4—4 of FIG. 2.

Referring to FIG. 3, a bottom view of the top cover 16 along view line 3—3 of FIG. 2 is shown. The front flange 18 includes a translucent section 44 which is adapted to transmit infrared light from the emitter 28. The top flange 18 includes a flange inner surface 46 and a flange edge 48 having an arcuate shape corresponding to that of the back edge 38. The flange inner surface 46 includes a plurality of elongated apertures 50 through which buttons extend as will be described. In addition, the flange inner surface 46 includes a plurality of upstanding pins 56 used for locating the button module 26. Referring to FIG. 4, a bottom view of the button module 26 and the emitter 28 along view line 4—4 of FIG. 2 is shown. The button module 26 includes a base 58 having a plurality of holes 60 for receiving the pins 56. This serves to locate the button module 26 relative to the top cover 16. The base 58 further includes an arcuate module edge 62 and a plurality of fingers 64 each having an associated button 66 formed thereon. The fingers 64 are fabricated from a resilient material and extend horizontally from the module edge 62 in a first position. Each button 66 extends through an associated aperture 50 in the top flange 18. Upon the application of pressure to a desired button 66, its associated finger deflects and moves away from the first position to a second position. This biases the finger to return to the first position. When pressure is released, the finger returns to the first position. Each button 66, when moved to the second position, serves to actuate an associated switch utilized for controlling typical television functions such as volume, channel selection, set up, tv/video and others.

The emitter 28 includes light emitting elements 68 which extend from a front surface 70 of the emitter 28. The light emitting elements 68 provide infrared light used in the operation of various electronic devices. For example, the light emitting elements 68 may be used in the operation of cordless headphones. The base 58 includes first 72 and second 74 support ribs for supporting the emitter 28. In addition, the base 58 includes first 76 and second 78 clips for removably securing the emitter 28 to the base 58. The first 76 and second 78 clips each include a resilient upright portion 80 that extends above the base 58. Each upright portion 80 includes an associated projecting portion 82 that extends transverse to the upright portion 80. In use, the front surface 70 of the emitter 28 is slid against each projecting portion 82, thus causing its associated upright portion 80 to deflect and move away from its upright position to a deflected position. This biases each upright portion 80 to move back to the upright position. Upon contact between the emitter 28 and the first 72 and second 74 support ribs, the front surface 70 is slid past each projecting portion 82, thus enabling the associated upright portion 80 to return to the upright position. This positions each projecting portion 82 above the emitter 28 to thus removably secure the emitter 28 between each projecting portion 82 and the first 72 and second 74 support ribs. Further, the base 58 includes a plurality of locator ribs 84 which are positioned adjacent the emitter 28 and which serve to locate the emitter 28 on the base 58. The emitter 28 is located such that the light emitting elements 68 are adjacent the translucent section 44 when assembled to the top cover 16 to enable transmittance of infrared light through the translucent section 44.

Figure 5:
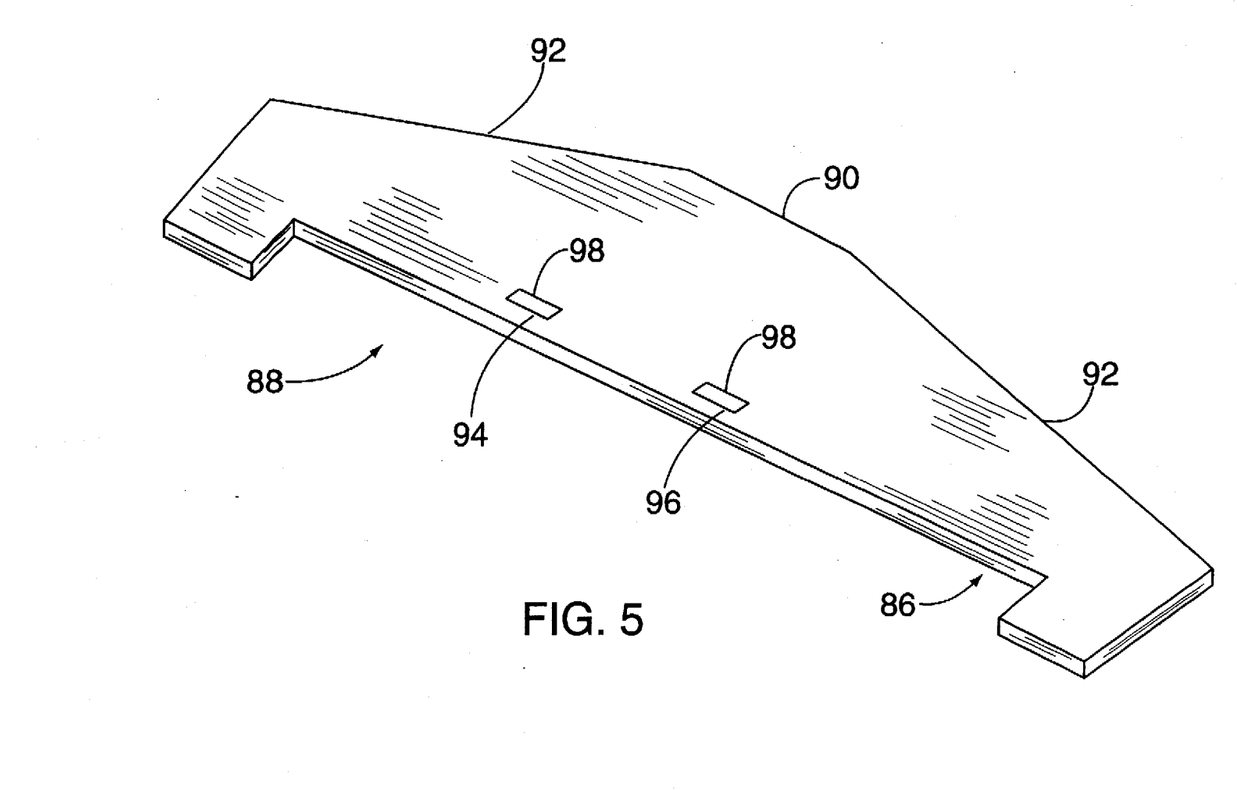
FIG. 5 is a bottom view of a printed circuit board along view line 5—5 of FIG. 2.

Referring to FIG. 5, a bottom view of the printed circuit board 30 along view line 5—5 of FIG. 2 is shown. The printed circuit board 30 includes a plurality of switches (not shown) each actuated by an associated button. In a preferred embodiment, the switches are separated from their associated button by approximately 1.5 mm in order to reduce the likelihood of contact therebetween when the cabinet 14 is subjected to shock and vibration. The switches are located on a bottom surface 86 of the printed circuit board 30 and are connected to associated circuitry (not shown) for controlling operation of the television 10. The printed circuit board 30 further includes a cutout 88 for providing clearance for the emitter 28 and a flat portion 90 positioned between sloping portions 92 for enabling the printed circuit board 30 to fit within the opening 42. In addition, the printed circuit board 30 includes first 94 and second 96 slots positioned adjacent to the cutout 88. The first 94 and second 96 slots each include a slot edge 98 and may be rectangularly shaped.

Referring back to FIG. 3, the flange inner surface 46 includes third 100, fourth 102 and fifth 104 support ribs which extend above the flange inner surface 46. The third 100, fourth 102 and fifth 104 support ribs are positioned to support selected areas of the printed circuit board 30 for minimizing flexing of the printed circuit board 30 when the cabinet 14 is subjected to shock and vibration. Further, the third 100, fourth 102 and fifth 104 support ribs serve to maintain a predetermined spacing between the printed circuit board 30 and the flange inner surface 46 suitable for minimizing the likelihood of contact between printed circuit board 30 and the flange inner surface 46.

The flange inner surface 46 further includes third 106, fourth 108 and fifth 110 clips which function in a manner substantially similar to that of the first 76 and second 78 clips and which also include a resilient upright portion 80 and a projecting portion 82 as previously described. Each projecting portion 82 serves to capture sections of the printed circuit board 30. In use, the printed circuit board 30 is positioned such that the projecting portions 82 of the third 106 and fourth 108 clips are aligned with the first 94 and second 96 slots, respectively, and the projecting portion 82 of the fifth clip 110 is aligned with the flat portion 90. The printed circuit board 30 is then pushed downward toward the third 100, fourth 102 and fifth 104 support ribs. Upon contact between the printed circuit board 30 and the third 100, fourth 102 and fifth 104 support ribs, the projecting portions 82 of the third 106 and fourth 108 clips are positioned above its associated slot edge 98 and the projecting portion 82 of the fifth clip 110 is positioned above the flat portion 90 to thus removably secure the printed circuit board 30 between each projection portion 82 and the third 100, fourth 102 and fifth 104 support ribs.

Figure 6:
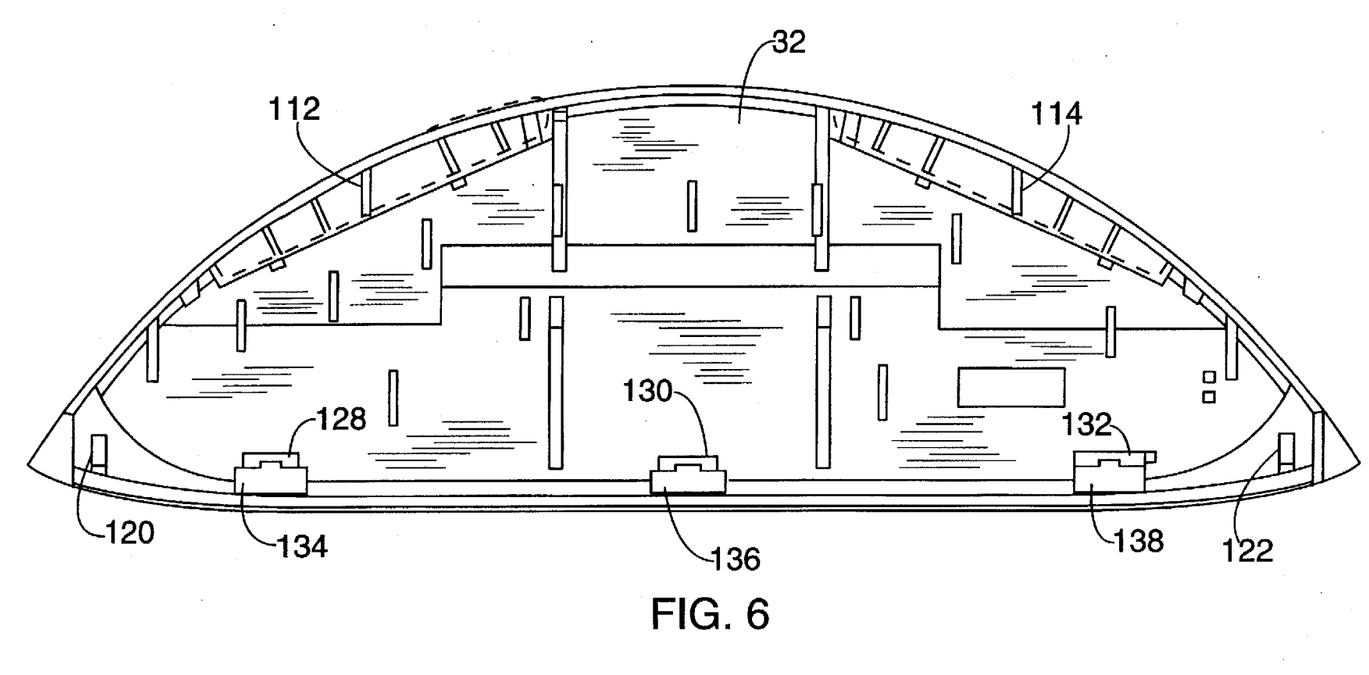
FIG. 6 is a top view of an assembly area.
Figure 7:
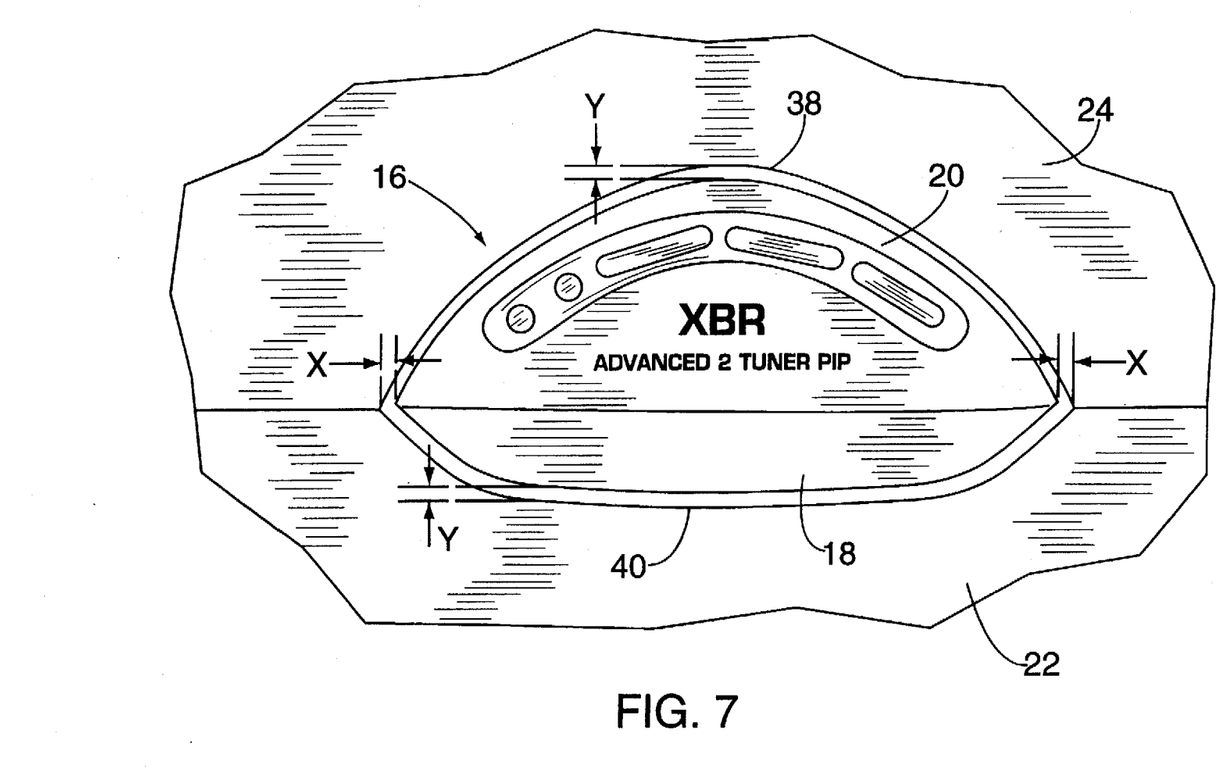
FIG. 7 depicts a uniform gap between a back edge and a top flange and between a front edge and a front flange.

Referring to FIG. 6, a top view of the assembly area 32 is shown. The back surface 36 includes outwardly extending first 112 and second 114 gap control ribs. Referring to FIG. 3 in conjunction with FIG. 6, the flange inner surface 46 includes third 116 and fourth 118 gap control ribs which are adapted to mate with the first 112 and second 114 gap control ribs, respectively. Upon assembly of the top cover 16 to the assembly area 32, the first 112 and second 114 gap control ribs are positioned in contact with the third 116 and fourth 118 gap control ribs, respectively. The first 112, second 114, third 116 and fourth 118 gap control ribs serve to locate the top cover 16 relative to the cabinet 14. Referring to FIG. 7 in conjunction with FIG. 3, the first 112 and second 114 gap control ribs are positioned relative to the third 116 and fourth 118 gap control ribs such that a substantially uniform gap X is formed between the back edge 38 and the top flange 20 and between the front edge 40 and the front flange 18 in a preferred embodiment, thus maintaining aesthetic appeal of the cabinet 14.

Figure 8:
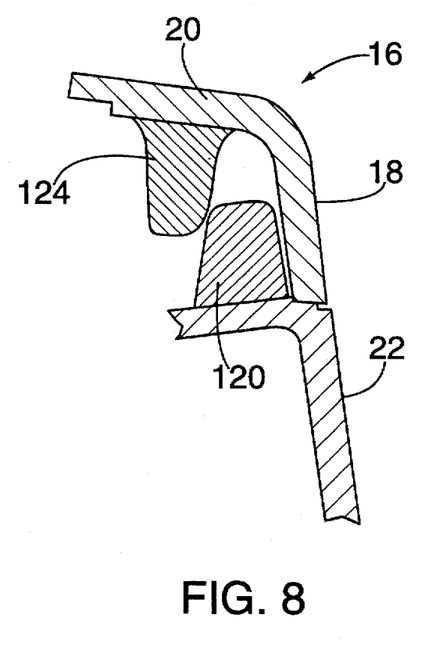
FIG. 8 is an exemplary cross sectional view of first and third protrusion control ribs, the top and front flanges and a second surface.

Referring back to FIG. 6, the assembly area 32 further includes first 120 and second 122 protrusion control ribs which extend from the assembly surface 32. Referring to FIG. 3 in conjunction with FIG. 6, the flange inner surface 46 further includes third 124 and fourth 126 protrusion control ribs which are positioned adjacent to the front flange 18. Upon assembly of the top cover 16 to the assembly area 32, the first 120 and second 122 protrusion control ribs are positioned in contact between the third 124 and fourth 126 protrusion control ribs, respectively, and the front flange 18. Referring to FIG. 8, an exemplary cross sectional view of the first 120 and third 124 protrusion control ribs, the top 20 and front 18 flanges and the first surface 22 is shown. Contact between the first protrusion control rib 120 and the third protrusion control rib 124 inhibits outward displacement of the top cover 16 relative to the first surface 22. Further, contact between first protrusion control rib 120 and the front flange 22 inhibits inward displacement of the top cover 16 relative to the first surface 22. As such, the front flange 18 remains flush with the first surface 22, thus also maintaining aesthetic appeal of the cabinet 14.

Figure 9:
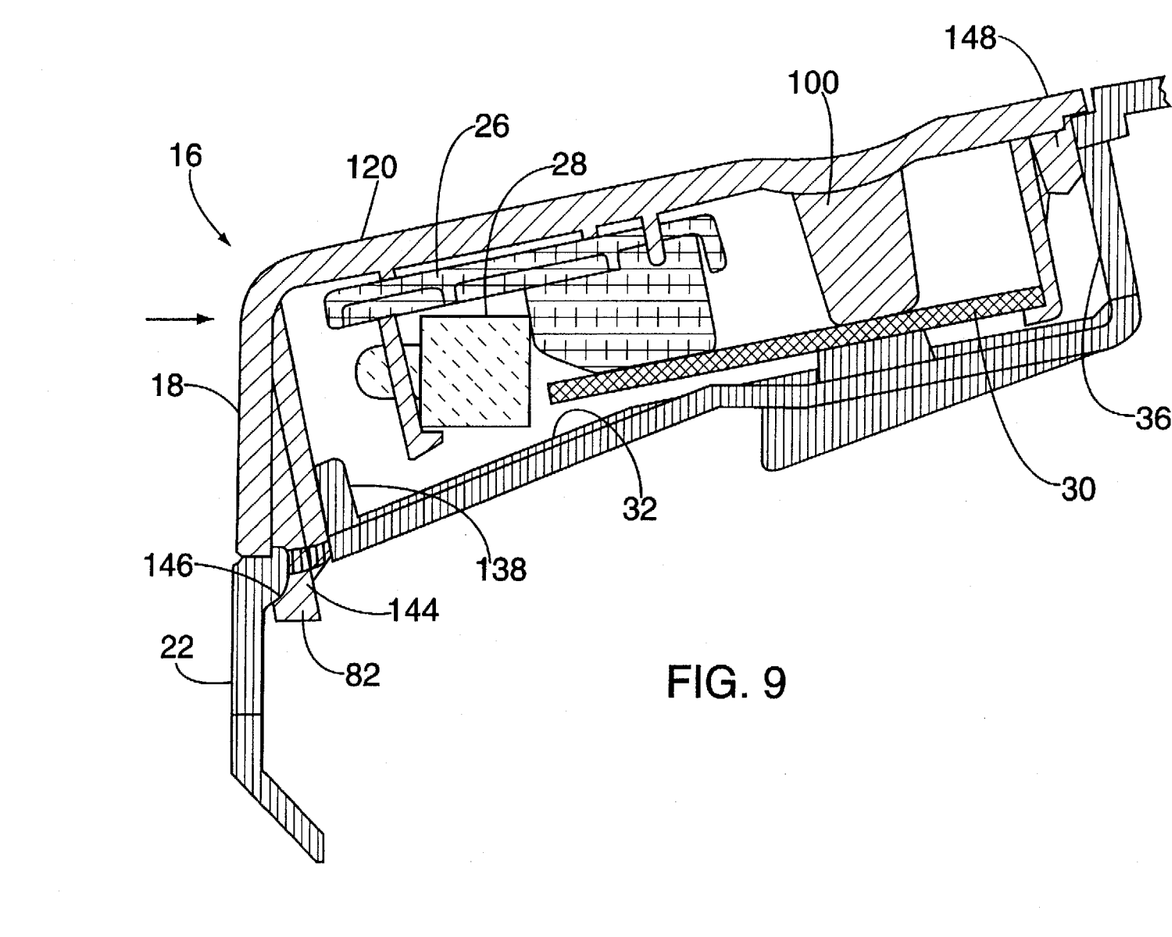
FIG. 9 is an exemplary cross sectional view of a projecting portion of a sixth clip positioned against an edge of a third slot.

Referring back to FIG. 6, the assembly surface 32 includes third 134, fourth 136 and fifth 138 slots. Referring to FIG. 3 in conjunction with FIG. 6, the front flange 18 includes sixth 140, seventh 142 and eighth 144 clips which function in a manner substantially similar to that of the first 76, second 78, third 106, fourth 108 and fifth 110 clips and which also include a resilient upright portion 80 and a projecting portion 82 as previously described. Upon positioning of the top cover 16 on the assembly area 32, the projecting portions 82 of the sixth 140, seventh 142 and eighth 144 clips capture edges of the third 134, fourth 136 and fifth 138 slots, respectively, to thus removably secure the top cover 16 to the assembly area 32 and substantially concealing the assembly area 32. Referring to FIG. 9, an exemplary cross sectional view of the projecting portion 82 of the eighth 144 clip is shown positioned against an edge 146 of the fifth slot 138.

It has been found that the application of a force (shown by arrow) on the front flange 18 causes the entire top cover 16 to undesirably "pop-out" or move up and out of the opening near the back surface 36. In accordance with the present invention, control ribs are provided which reduce the likelihood of cover movement. Referring to FIG. 6, these include first 128, second 130 and third 132 front control ribs which extend from the assembly surface 32 and which are positioned adjacent to the third 134, fourth 136 and fifth 138 slots, respectively. Referring to FIG. 3, a plurality of back control ribs 148 are provided which extend from the flange inner surface 46. The first 128, second 130 and third 132 front control ribs are placed in contact and behind the upright portions 80 of the sixth 140, seventh 142 and eighth 144 clips, respectively. The rear control ribs 148 are positioned in contact with the back surface 36. As such, the first 128, second 130 and third 132 front control ribs and the back control ribs 148 are positioned for inhibiting horizontal movement of the top cover 16. Therefore, the top cover 16 is inhibited from moving upon the application of a force on the front flange 18. Further, the back control ribs 148 serve to provide a uniform gap Y between edges of the top cover 16 and the cabinet 14.

The top cover 16, button module 26, emitter 28 and printed circuit board 30 are assembled without the used of screw type fasteners. In particular, the emitter 28 is removably secured to the button module 26 by the first 76 and second 78 clips. The button module 26 is then positioned on the top cover 16 and located therein by the pins 56. The printed circuit board 30 is then positioned over the button module 26 and removably secured to the top cover 16 by the third 106, fourth 108 and fifth 110 clips, thus sandwiching the button module 26 between the top cover 16 and the printed circuit board 30. The top cover 16 is then removably secured to the cabinet 14 by the sixth 140, seventh 142 and eighth 144 clips. As such, the cost of manufacture and assembly time for the control panel 12 are both substantially reduced.

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations are far within the scope of the appended claims.

What is claimed is:

1. A control panel for a monitor having a cabinet, comprising:

a cover having a top flange and a front flange, said top flange including a plurality of apertures and first resilient clips and said front flange including a plurality of second resilient clips and a translucent section adapted for transmitting infrared light;

a button module having resilient buttons and a plurality of third resilient clips, each of said buttons extending through an associated aperture being adapted to enable operation of selected functions of said monitor;

an emitter having light emitting elements for emitting infrared light, said emitter being removably secured to said top cover by said third resilient clips such that said light emitting elements are positioned adjacent said translucent section;

a printed circuit board having circuitry for operation of said monitor, said printed circuit board being removably secured to said top flange by said first resilient clips and wherein said button module is removably secured between said printed circuit board and said top flange; and an assembly area located in an opening formed in said cabinet, wherein said top cover is removably secured to said assembly area by said second resilient clips to conceal said assembly area.

2. The control panel according to claim 1, wherein said top flange further includes a plurality of upstanding pins and said button module includes a hole associated with each of said pins, wherein said pins are positioned within its associated hole to locate said button module relative to said top flange.

3. The control panel according to claim 1, further including support ribs for maintaining a predetermined spacing between the printed circuit board and the top flange.

4. The control panel according to claim 3, wherein said support ribs support selected areas of said printed circuit board for minimizing flexing of said printed circuit board.

5. The control panel according to claim 1, wherein said assembly area includes a back surface having fifth ribs and said top flange includes sixth ribs for maintaining a substantially uniform gap between said top cover and said cabinet.

6. A control panel for a monitor having a cabinet, comprising:

a cover having a top flange and a front flange, said top flange including a plurality of apertures and first resilient clips and said front flange including a plurality of second resilient clips and a translucent section adapted for transmitting infrared light;

a button module having resilient buttons and a plurality of third resilient clips, each of said buttons extending through an associated aperture and being adapted to enable operation of selected functions of said monitor;

an emitter having light emitting elements for emitting infrared light, said emitter being removably secured to said top cover by said third resilient clips such that said light emitting elements are positioned adjacent said translucent section;

a printed circuit board having circuitry for operation of said monitor, said printed circuit board being removably secured to said top flange by said first resilient clips and wherein said button module is removably secured between said printed circuit board and said top flange; and an assembly area located in an opening formed in first and second surfaces of said cabinet, wherein said top cover is removably secured to said assembly area by said second resilient clips to conceal said assembly area and wherein said top flange further includes a plurality of first ribs and said assembly area includes a second rib associated with each of said first ribs, each said second rib being positioned in contact between its associated first rib and said front flange to position said front flange flush with said first surface and to inhibit displacement of said front flange relative to said first surface.

7. The control panel according to claim 6, wherein said top flange further includes a plurality of upstanding pins and said button module includes a hole associated with each of said pins, wherein said pins are positioned within its associated hole to locate said button module relative to said top flange.

8. The control panel according to claim 6, further including support ribs for maintaining a predetermined spacing between the printed circuit board and the top flange.

9. The control panel according to claim 8, wherein said support ribs support selected areas of said printed circuit board for minimizing flexing of said primed circuit board.

10. The control panel according to claim 6, wherein said assembly area includes a back surface having fifth ribs and said top flange includes sixth ribs for minting a substantially uniform gap between said top cover and said cabinet.

11. A control panel for a monitor having a cabinet, comprising:

a cover having a top flange and a front flange, said top flange including a plurality of apertures and first resilient clips and said front flange including a plurality of second resilient clips and a translucent section adapted for transmitting infrared light;

a button module having resilient buttons and a plurality of third resilient clips, each of said buttons extending through an associated aperture and being adapted to enable operation of selected functions of said monitor;

an emitter having light emitting elements for emitting infrared light, said emitter being removably secured to said top cover by said third resilient clips such that said light emitting elements are positioned adjacent said translucent section;

a printed circuit board having circuitry for operation of said monitor, said printed circuit board being removably secured to said top flange by said first resilient clips and wherein said button module is removably secured between said printed circuit board and said top flange; and an assembly area located in an opening formed in first and second surfaces of said cabinet, wherein said top cover is removably secured to said assembly area by said second resilient clips to conceal said assembly area and wherein said top flange further includes a plurality of first ribs and said assembly area includes a second rib associated with each of said first ribs, each said second rib being positioned in contact between its associated first rib and said front flange to position said front flange flush with said first surface and to inhibit displacement of said front flange relative to said first surface and wherein said assembly area further includes third ribs and said top flange includes fourth ribs, said third ribs being positioned in contact with said second resilient clips and said fourth ribs being positioned in contact with a back surface of said assembly area to inhibit removal of said top cover upon the application of a force to the front flange.

12. The control panel according to claim 11, wherein said top flange further includes a plurality of upstanding pins and said button module includes a hole associated with each of said pins, wherein said pins are positioned within its associated hole to locate said button module relative to said top flange.

13. The control panel according to claim 11, further including support ribs for maintaining a predetermined spacing between the printed circuit board and the top flange.

14. The control panel according to claim 13, wherein said support ribs support selected areas of said printed circuit board for minimizing flexing of said printed circuit board.

15. The control Paget according to claim 11, wherein said assembly area includes a back surface having fifth ribs and said top flange includes sixth ribs for minting a substantially uniform gap between said top cover and said cabinet.

* * * * *